United States Patent
Koski et al.

(10) Patent No.: US 11,107,024 B2
(45) Date of Patent: Aug. 31, 2021

(54) GENETIC SMARTJOBS SCHEDULING ENGINE

(71) Applicant: nMetric, LLC, Santa Ana, CA (US)

(72) Inventors: Christine Koski, Dallas, TX (US); Stephen Cook, Albuquerque, NM (US)

(73) Assignee: NMETRIC, LLC, Dallas, TX (US)

( * ) Notice: Subject to any disclaimer, the term of this patent is extended or adjusted under 35 U.S.C. 154(b) by 0 days.

(21) Appl. No.: 15/871,611

(22) Filed: Jan. 15, 2018

(65) Prior Publication Data

US 2019/0220792 A1 Jul. 18, 2019

(51) Int. Cl.
*G06Q 10/06* (2012.01)
*G06Q 10/10* (2012.01)
*G06N 3/08* (2006.01)

(52) U.S. Cl.
CPC ....... *G06Q 10/06316* (2013.01); *G06N 3/086* (2013.01); *G06Q 10/0639* (2013.01); *G06Q 10/063112* (2013.01); *G06Q 10/1097* (2013.01)

(58) Field of Classification Search
CPC .......... G06N 99/005; G06N 3/126; G06Q 10/06316; G06Q 10/063112; G06Q 10/0639; G06Q 10/1097
See application file for complete search history.

(56) References Cited

U.S. PATENT DOCUMENTS

| | | | |
|---|---|---|---|
| 5,140,530 A | 8/1992 | Guha et al. | |
| 5,319,781 A | 6/1994 | Syswerda | |
| 5,848,403 A | 12/1998 | Gabriner et al. | |
| 6,957,200 B2 | 10/2005 | Buczak et al. | |
| 7,587,329 B2 | 9/2009 | Thompson et al. | |
| 8,069,127 B2 | 11/2011 | Taylor et al. | |
| 8,170,962 B2 * | 5/2012 | Lim | G06N 3/126 706/13 |
| 8,655,705 B2 | 2/2014 | Riepshoff et al. | |
| 9,183,058 B2 * | 11/2015 | Li | G06F 9/5066 |
| 9,224,121 B2 * | 12/2015 | Li | G06Q 10/087 |

(Continued)

FOREIGN PATENT DOCUMENTS

WO 02082371 A2 10/2002

OTHER PUBLICATIONS

Imed Kacem, Slim Hammadi, and Pierre Borne, "Approach by Localization and Multiobjective Evolutionary Optimization for Flexible Job-Shop Scheduling Problems", Feb. 2002, IEEE Transactions on Systems, Man, and Cybernetics—Part C: Applications and Reviews, vol. 32, No. 1, pp. 1-13.*

(Continued)

*Primary Examiner* — Kamran Afshar
*Assistant Examiner* — Ying Yu Chen
(74) *Attorney, Agent, or Firm* — Fish IP Law, LLP (57) ABSTRACT

In a method for handling a plurality of heuristics for task selection in a genetic algorithm, a task scheduling engine generates a population of tasks associated with an overall objective, identifies multiple jobs associated with an overall objective, compiles the multiple jobs into a genome, and assigns one or more tasks to each job of the multiple jobs. The task scheduling engine also assigns a task heuristic byte defining multiple task heuristics that can be applied to the each job of the genome, randomly assigns a task heuristic from the multiple task heuristics to the each job, and determines a value score for the genome.

13 Claims, 7 Drawing Sheets

(56) References Cited

U.S. PATENT DOCUMENTS

| | | | |
|---|---|---|---|
| 2007/0245300 A1* | 10/2007 | Chan | G06Q 10/06 717/105 |
| 2007/0294408 A1* | 12/2007 | Jackson | G06F 9/5066 709/226 |
| 2009/0315735 A1 | 12/2009 | Bhavani et al. | |
| 2016/0179081 A1 | 6/2016 | Sun et al. | |
| 2017/0364812 A1* | 12/2017 | Thompson | G06N 3/126 |

OTHER PUBLICATIONS

Jie Gaoa, Linyan Sun, and Mitsuo Gen, "A hybrid genetic and variable neighborhood descent algorithm for flexible job shop scheduling problems", Feb. 2, 2007, Computers & Operations Research 35, pp. 2892-2907.*

Dirk C. Mattfeld and Christian Bierwirth, "An efficient genetic algorithm for job shop scheduling with tardiness objectives", 2004, European Journal of Operational Research 155 (2004), pp. 616-630.*

Aydemir, E. & Koruca, H. I., "A New Production Scheduling Module Using Priority-Rule Based Genetic Algorithm", 2015, Int j simul model 14 (2015) 3, p. 450-462. (Year: 2015).*

Fredrik G. Hilding and Koren Ward, "Automated Operator Selection on Genetic Algorithms", 2005, KES 2005, LNAI 3684, pp. 903-909. (Year: 2005).*

Felix T.S. Chan, S.H. Chung, and P.L.Y. Chan, "An adaptive genetic algorithm with dominated genes for distributed scheduling problems", Available online Apr. 29, 2005, Expert Systems with Applications vol. 29, Issue 2, Aug. 2005, pp. 364-371. (Year: 2005).*

Bilgesu AK, A guide for genetic algorithm based on parallel machine scheduling and flexible job-shop scheduling, SciVerse ScienceDirect, Procedia—Social and Behavior Sciences 62 (2012), pp. 817-823.

* cited by examiner

GENETIC SMARTJOBS SCHEDULING ENGINE

FIELD OF THE INVENTION

The field of the invention is scheduling system.

BACKGROUND

When a company has a series of tasks that need to be completed, a manager typically allocates employees towards each task. Computer scheduling systems, for example Microsoft Outlook®, can be helpful to visualize such schedules. For example, a scheduler could use a computer scheduling system to block off specific times of the day for employees to perform certain tasks, and assign specific employees to that task. Each employee would then have a calendar of tasks to do throughout each day, week, and month, which could be easily visualized and organized. In order for a scheduler to assign specific employees to each task, however, the manager needs to manually track each employee's schedule and allocate each employee to the appropriate task.

Further, the scheduler not only needs to determine how to schedule and allocate tasks but also needs to establish priorities for each task in order to maximize efficiency. For example, a scheduler can instruct employees to prioritize speed over accuracy in a situation where a high level of precision is not required, and vice versa. Each task would then be allocated to employees and assigned task priorities that, over time, increase the overall efficiency of the system. However, the number of combinations of particular task allocation and task priorities is often far too numerous for people to test all the combinations in order to maximize efficiency. Additionally, a large number of combinations can produce multiple possible combinations of task allocations and task priorities sufficient to complete the task. However, the step of selecting a combination of task allocation and task priority adds an undesirable variable because it introduces human judgment/human error into the system.

US2009/0315735 to Bhavani teaches a computer system for managing patient flow in a hospital, where a manager could tag specific patients, medical employees, and resources with RFID chips to determine where each patient, employee, and resource is, and allocate each resource accordingly as needed. For example, if there are too many patients waiting for an examination room, a patient could be automatically relocated to an examination room with a shorter line by sending a message to an available employee to redirect that patient. Bhavani, however, requires the system to manually track each patient, employee, and resource by a unique identifier.

U.S. Pat. No. 7,587,329 to Thompson teaches a computer system for managing a health clinic, where a manager could input a series of attributes into a computer that an on-duty nurse needs to have to accomplish a specific task. The system then matches available nurses with those requirements with the task in order to accomplish the task, and can send out schedules to each nurse, letting that nurse know what tasks to perform. Thompson's computer system, however, fails to enable a manager to input a series of attributes for resources, such as patient requirements for operating rooms, intensive care unit beds, or heart rate monitor machines.

Bhavani, Thompson, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for scheduling systems enhanced with genetic algorithms to increase efficiency.

SUMMARY OF THE INVENTION

A task-orientated computer system allows a manager to calendar tasks that involve resources (e.g., people, equipment, tools, rooms, virtual rooms, computers, etc) by focusing on the attributes of the tasks and resources, rather than the just the resources themselves.

Among other things, the inventive subject matter provides apparatus, systems, and methods in which a genetic algorithm recombines and mutates task schedules with task heuristics in order to increase the overall efficiency of the system. As used herein, a "resource" is any resource, whether physical or virtual, living or nonliving. Examples include a room, a building, a consumable item, a portable tool, a piece of equipment that is fixed to a location, a person, or an animal. Each resource typically has a series of unique and non-unique attributes that are associated with the resource. As the terms imply, unique attributes are attributes that are unique to that particular resource, and non-unique attributes are attributes that can be common by more than one resource. For example, if the resource is a only available at particular times of the week (e.g. an individual or a machine that has limited availability), then the weekly availability of the resource is an attribute of the resource. As used herein "jobs" refers to subsets of one or more tasks that are required to achieve an overall objective.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including facilitating the scheduling of events.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
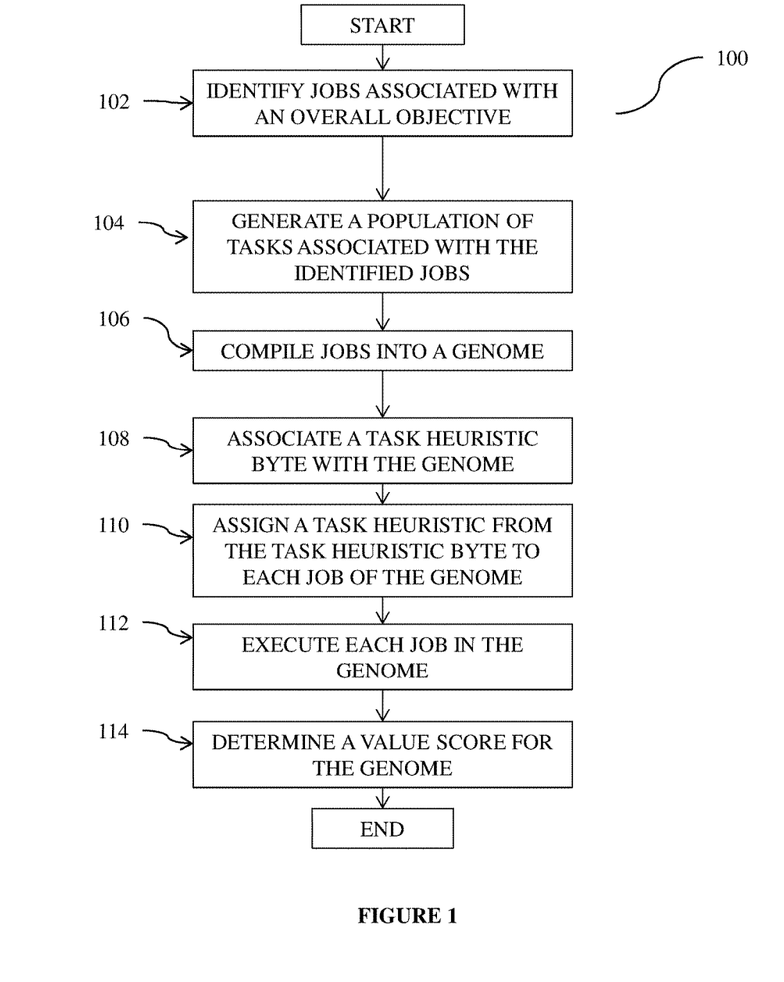
FIG. 1 is a schematic of a method of determining a value score for a genome based on a task heuristic assigned to each job of the genome.

FIG. 1 is a schematic of task scheduling engine 100 of determining a value score for a genome based on a task heuristic assigned to each job of the genome. As referenced herein, the term "task" can also refer to available resources. For example, the steps of FIG. 1 can determine a value score for the resources and associated resource heuristics based on a particular resource requirement.

Task scheduling engine 100 identifies one or more jobs associated with an overall objective (step 102). As defined herein, an overall objective refers to any end goal achievable through the execution of one or more jobs. Tasks are any actions required to complete a job. A job can comprise multiple tasks. For example, in scheduling the production of a widget, each job is associated with the fabrication of a sub-component of the widget, and the fabrication of the subcomponents of the widget each comprise multiple tasks.

Task scheduling engine 100 uses one or more predetermined job schedules associated with the overall task to determine which jobs are associated with the overall objective. Alternatively, task scheduling engine 100 uses machine learning techniques to analyze historical trends to predict what jobs are necessary to achieve the overall objective. For example, task scheduling engine 100 can use a supervised learning classifier to infer a function from labeled training data (e.g., set of training examples). In another example, task scheduling engine 100 uses time-series forecasting to determine maximize the concurrent execution of jobs to minimize the amount of time to achieve the overall objective. It is contemplated that task scheduling engine 100 can use any technique known in the art to identify one or more jobs associated with the overall objective.

Task scheduling engine 100 generates a population of tasks associated with the identified jobs (step 104). Tasks comprise any action required to complete a job. For example, task scheduling engine 100 can identify that a quality control step is required to complete the construction of an automobile motor and generate a population of tasks that are associated with the quality control step, such as checking raw power output, confirming proper power bands using a dynamometer, and verifying correct compressions levels in the cylinders.

Task scheduling engine 100 compiles the jobs into a genome (step 106). Task scheduling engine 100 preferably compiles the jobs, which act as genes, into a genome randomly and/or subject to additional variables (e.g. shortest task first, highest priority, etc.). For example, task scheduling engine 100 can compile a genome where jobs are grouped closer together on the genome based on shared traits, such as a manufacturing step shared by each job. By grouping similar jobs in closer proximity to one another in the genome, subsequent recombination or mutation of the genome will be less likely to create dramatic changes in related jobs. On the other hand, task scheduling engine 100 can compile a genome where the jobs are distributed in a way that attempts to minimize grouping based on similar traits in order to quicken the evolution of the genome.

Task scheduling engine 100 associates a task heuristic byte with the genome (step 108). A task heuristic byte is a collection of different task heuristics (e.g., task priorities) that can be associated with each job. For example, a task heuristic byte can contain the following task priorities in a manufacturing setting: shortest completion time, longest completion time, highest safety, lowest safety, highest cost, and lowest cost. However, task priorities are not binary in nature and can include additional qualifiers, such as "in the upper $50^{th}$ percentile" and "between the $25^{th}$ and $75^{th}$ percentile". It is contemplated that the task priorities can comprise any qualifiers that add an additional variable affecting the execution of each job.

Task scheduling engine 100 assigns a task heuristic from the task heuristic byte to each job of the genome (step 110). Task scheduling engine 100 preferably assigns a task heuristic byte to each job of the genome at random. In alternative embodiments, task scheduling engine 100 limits and/or expands the assignable task heuristics based on the particular job. For example, task scheduling engine 100 can be programmed to not pick task heuristics associated with completion time if the job can only be executed by one machine with a substantially invariable completion time (e.g., an electroplating step requiring the same amount of time to complete regardless of the dimensions of the item).

Task scheduling engine 100 sends instructions to one or more resources to execute each job in the genome (step 112). It is contemplated that task scheduling engine 100 executes each job directly in a fully automated system. For example, task scheduling engine 100 can execute each job/heuristic pair in the manufacturing of an automobile by sending instructions to one or more robots in an automated manufacturing plant. It is also contemplated that task scheduling engine 100 instructs one or more individuals to carry out each job/heuristic pair. For example, task scheduling engine 100 can instruct multiple machinists to carry out each job/heuristic associated with the manufacture of an automobile engine block in a manner designated by the task heuristic. However, task scheduling engine 100 is not limited to purely automated or purely user-based systems and can execute each job by any means or combination of means available.

Task scheduling engine 100 determines a value score of the genome (step 114). A value score indicates the overall success of a genome in achieving one or more metrics, such as completion time, accuracy of the process, and production costs.

Task scheduling engine 100 preferably determines a value score using a fitness function. A fitness function is a particular type of objective function that is used to summarize, as a single figure of merit, how close a given solution is achieving the set aims. Once task scheduling engine 100 determines the value score of a genome, the genome can be discarded, mutated, or recombined with other genomes.

Figure 2:
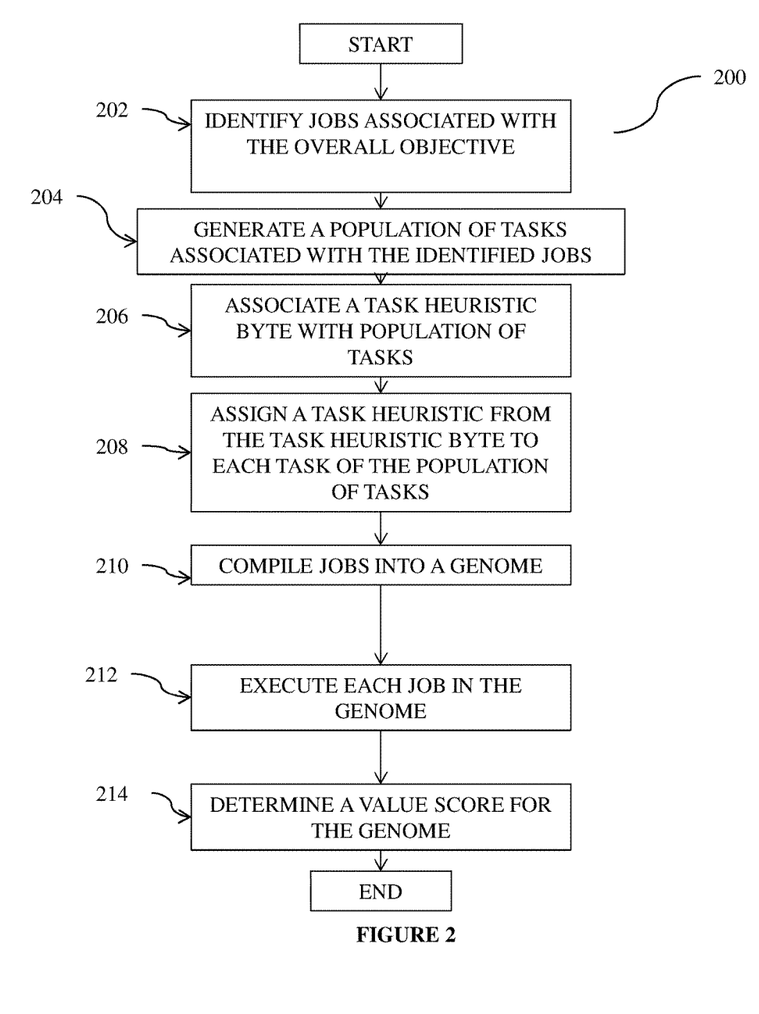
FIG. 2 is a schematic of a method of determining a value score for a genome based on a task heuristic assigned to each task of the genome.

FIG. 2 is a schematic of a method of determining a value score for a genome based on a task heuristic assigned to each task of the genome.

Task scheduling engine 200 identifies one or more jobs associated with an overall objective (step 202). For example, in scheduling the production of a widget, each job is associated with the fabrication of a sub-component of the widget, and the fabrication of the subcomponents of the widget each comprise multiple tasks.

Task scheduling engine 200 uses one or more predetermined job schedules associated with the overall task to determine which jobs are associated with the overall objective. Alternatively, task scheduling engine 200 uses machine learning techniques to analyze historical trends to predict what jobs are necessary to achieve the overall objective. For example, task scheduling engine 100 can use a supervised learning classifier to infer a function from labeled training data (e.g., set of training examples). In another example, task scheduling engine 200 can use time-series forecasting to determine maximize the concurrent execution of jobs to minimize the amount of time to achieve the overall objective. It is contemplated that task scheduling engine 100 can use any technique known in the art to identify one or more jobs associated with the overall objective.

Task scheduling engine 200 generates a population of tasks associated with the identified jobs (step 204). Tasks comprise any action required to complete a job. For example, task scheduling engine 200 can identify that a quality control step is required to complete the construction of an automobile motor and generate a population of tasks that are associated with the quality control step, such as checking raw power output, confirming proper power bands using a dynamometer, and verifying correct compressions levels in the cylinders.

Task scheduling engine 200 associates a task heuristic byte with the population of tasks (step 206). A task heuristic byte is a collection of different task heuristics (e.g., task priorities) that can be associated with each task. For example, a task heuristic byte can contain the following task priorities in a manufacturing setting: shortest completion time, longest completion time, highest safety, lowest safety, highest cost, and lowest cost. It is contemplated that the task priorities add an additional variable to each task and can add multiple variables in jobs comprising multiple tasks.

Task scheduling engine 200 assigns a task heuristic from the task heuristic byte to each task of the population of tasks (step 208). Task scheduling engine 200 preferably assigns a task heuristic byte to each task associated with each job of the genome at random. In alternative embodiments, task scheduling engine 200 limits and/or expands the assignable task heuristics based on the particular task. For example, task scheduling engine 200 can be programmed to not pick task heuristics associated with completion time if the task can only be executed by one machine with a substantially invariable completion time (e.g., an electroplating step requiring the same amount of time to complete regardless of the dimensions of the item).

Task scheduling engine 200 compiles the jobs into a genome (step 210). Task scheduling engine 100 compiles the jobs, which act as genes, into a genome randomly or subject to additional variables. For example, task scheduling engine 200 can compile a genome where jobs are grouped closer together on the genome based on shared traits, such as a manufacturing step shared by each job. By grouping similar jobs in closer proximity to one another in the genome, subsequent recombination or mutation of the genome will be less likely to create dramatic changes in related jobs. On the other hand, task scheduling engine 200 can compile a genome where the jobs are distributed in a way that attempts to minimize grouping based on similar traits in order to quicken the evolution of the genome.

Task scheduling engine 200 sends instructions to one or more resources to execute each job in the genome (step 212). It is contemplated that task scheduling engine 200 executes each job directly in a fully automated system. For example, task scheduling engine 200 can execute each job/heuristic pair in the manufacturing of an automobile by sending instructions to one or more robots in an automated manufacturing plant.

It is also contemplated that task scheduling engine 200 instructs one or more individuals to carry out each job/heuristic pair. For example, task scheduling engine 200 can instruct multiple machinists to carry out each job/heuristic associated with the manufacture of an automobile engine block in a manner designated by the task heuristic. However, task scheduling engine 200 is not limited to purely automated or purely user-based systems and can execute each job by any means or combination of means available.

Task scheduling engine 200 determines a value score of the genome (step 214). A value score indicates the overall success of a genome in achieving one or more metrics, such as completion time, accuracy of the process, and production costs.

Task scheduling engine 200 preferably determines a value score using a fitness function. A fitness function is a particular type of objective function that is used to summarize, as a single figure of merit, how close a given solution is achieving the set aims. Once task scheduling engine 200 determines the value score of a genome, the genome can be discarded, mutated, or recombined with other genomes. A value score can comprise multiple value sub-scores covering a variety of quantifiable traits.

Figure 3:
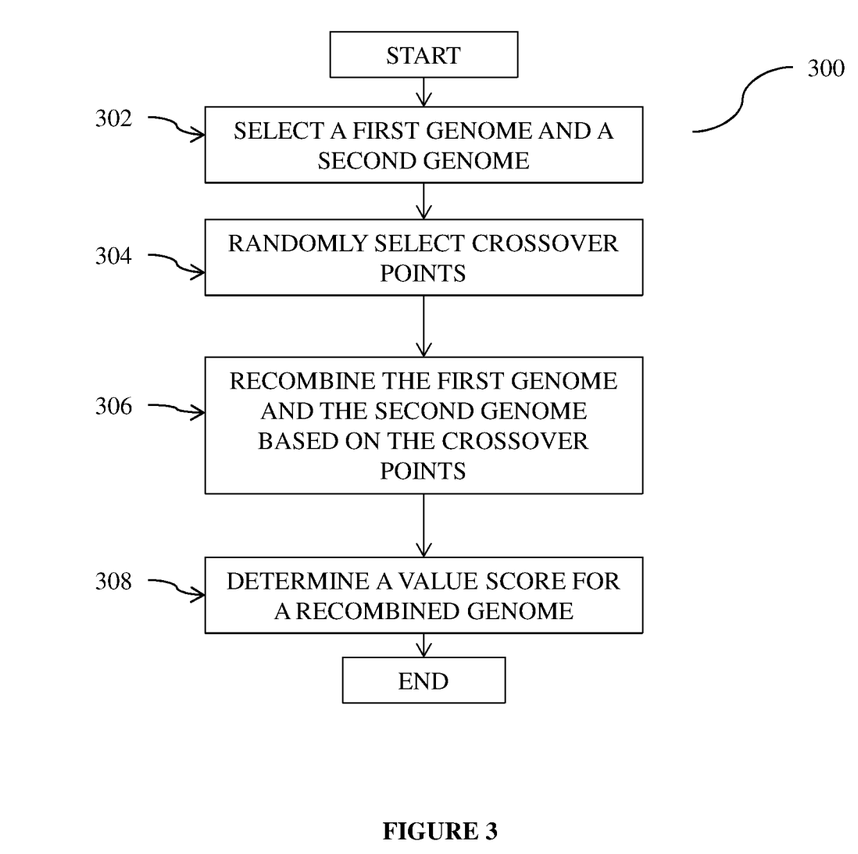
FIG. 3 is a schematic of a method of recombining two genomes into a recombined genome and determining a value score for the recombined genome.

FIG. 3 is a schematic of a method of recombining two genomes into a recombined genome and determining a value score for the recombined genome.

Task scheduling engine 300 selects a first genome and a second genome (step 302). It is contemplated that task scheduling engine 300 selects the first genome and the second genome based on their respective value scores. In some embodiments, task scheduling engine 300 selects the first genome and the second genome based on value scores meeting a similarity threshold. For example, task scheduling engine 300 can be programmed to select the two highest scores out of one hundred scores to be recombined. In another embodiment, task scheduling engine 300 selects the first genome and the second genome based their value scores meeting a dissimilarity threshold. For example, task scheduling engine 300 can select a first genome with the highest sub-score in overall completion time with a second genome with the highest sub-score in overall manufacturing accuracy. In yet another embodiment, task scheduling engine 300 can choose genomes having the highest scores in different categories and meeting a dissimilarity threshold (e.g. tournament selection). It is also contemplated that task scheduling engine 300 can select more than two genomes for recombination. For example, task scheduling engine 300 can choose three genomes with the highest scores to be subsequently recombined at crossover points in a three-way crossover.

Task scheduling engine 300 randomly selects one or more crossover points (step 304). Crossover points are points in a task schedule between jobs that are mirrored in both a first and a second genome. For example, a first and second genome could require the same jobs to be performed in the same order but have a different combination of task heuristics associated with each of the jobs.

Task scheduling engine 300 preferably selects one or more crossover points at random. Selecting the one or more crossover points at random increases the genetic variability in the recombined offspring of two genomes. Alternatively, task scheduling engine 300 selects one or more crossover points based on preset parameters. For example, task scheduling engine 300 can select from 5 different recombination sites on each genome in order to increase the genetic variability of the system while preventing groups of related jobs/genes from evolving separately.

Task scheduling engine 300 recombines the first genome and the second genome at the one or more crossover points (step 306). The first genome and the second genome switch portions of the respective genomes at the one or more crossover points. For example, if a first genome comprising the jobs $A_1$, $B_1$, $C_1$, and $D_1$ in that order is recombined with a second genome comprising the jobs $A_2$, $B_2$, $C_2$, and $D_2$ in that order between jobs "A" and "B" and between jobs "C" and "D", then the recombined genomes would produce a first recombined genome comprising $A_1$, $B_2$, $C_2$, and $D_1$ and a second recombined genome comprising $A_2$, $B_1$, $C_1$, and $D_2$.

In a preferred embodiment, task scheduling engine 300 uses position based crossover to recombine the first genome and the second genome using one or more pre-selected genes to be recombined into an offspring genome. Position based crossover uses a shared genome and crossover point format to limit variability in recombined genomes to the inherent characteristics of the genes themselves. For example, task scheduling engine 300 can select genes $A_1$ and $C_1$ from a first parent genome to be input into the offspring genome and the remaining genes, $B_2$ and $D_2$ can be filled by the second parent genome. Position based crossover allows task scheduling engine 300 to control gene expression in offspring genomes while ignoring dependencies for each job and avoiding additional steps to verify schedule viability.

Figure 4:
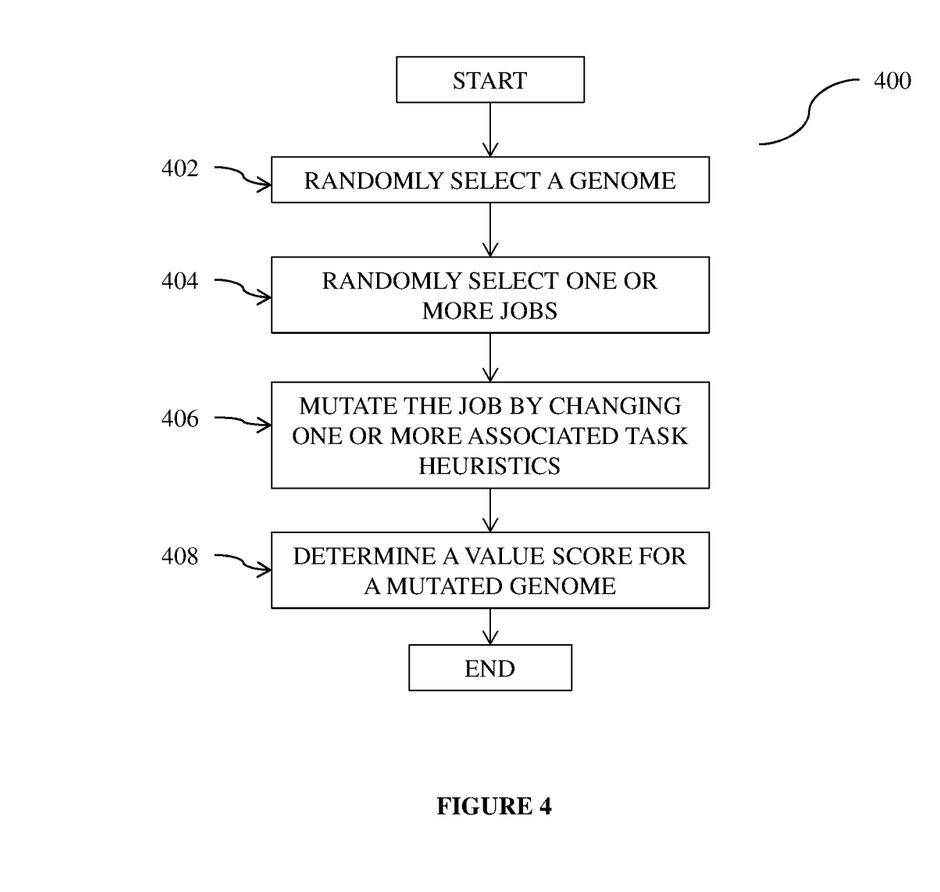
FIG. 4 is a schematic of a method of randomly mutating a job in a genome and determining a value score for the mutated genome.

FIG. 4 is a schematic of a method of randomly mutating a job in a genome and determining a value score for the mutated genome.

Task scheduling engine 400 randomly selects a genome (step 402). Alternatively, task scheduling engine 400 can be programmed to select genomes fitting one or more parameters. For example, task scheduling engine 400 can be programmed to select a genome at random from a group of genomes that at least have value scores above the $50^{th}$ percentile.

Task scheduling engine 400 randomly selects one or more jobs associated with one or more task heuristics (step 404). Task scheduling engine 400 can alternatively select one or more jobs based on one or more parameters. For example, task scheduling engine can be limited to only selecting jobs that can be associated with a variable completion time, which would exclude jobs that have an invariable completion time. It is preferred, however, that task scheduling engine 400 selects the one or more jobs at random.

Task scheduling engine 400 mutates the one or more jobs by randomly changing the one or more task heuristics (step 406). Task scheduling engine 400 can alternatively mutate the one or more jobs subject to a parameter. For example, task scheduling engine 400 can be programmed to avoid mutating task heuristics associated with overall manufacturing quality in the manufacture of goods that don't require strict quality control, such as intermediate products that will be heavily processed to a refined state in later steps. In one embodiment, task scheduling engine 400 can apply a scheduling direction mutation task heuristic that causes task scheduling engine 400 to schedule jobs based either on the earliest due date going forwards or the latest due date going backwards.

Task scheduling engine 400 determines a value score of the genome (step 408). The value score indicates the overall success of a genome in achieving one or more metrics, such as completion time, accuracy of the process, and production costs. Task scheduling engine 400 preferably determines a value score using a fitness function. A fitness function is a particular type of objective function that is used to summarize, as a single figure of merit, how close a given solution is achieving the set aims. Once task scheduling engine 400 determines the value score of a genome, the genome can be discarded, further mutated, or further recombined with other genomes. A value score can comprise multiple value subscores covering a variety of quantifiable traits. It is contemplated that task scheduling engine 400 preferably determines a value score of each genome of a population of genomes after the entire population has been recombined and/or mutated.

Figure 5:
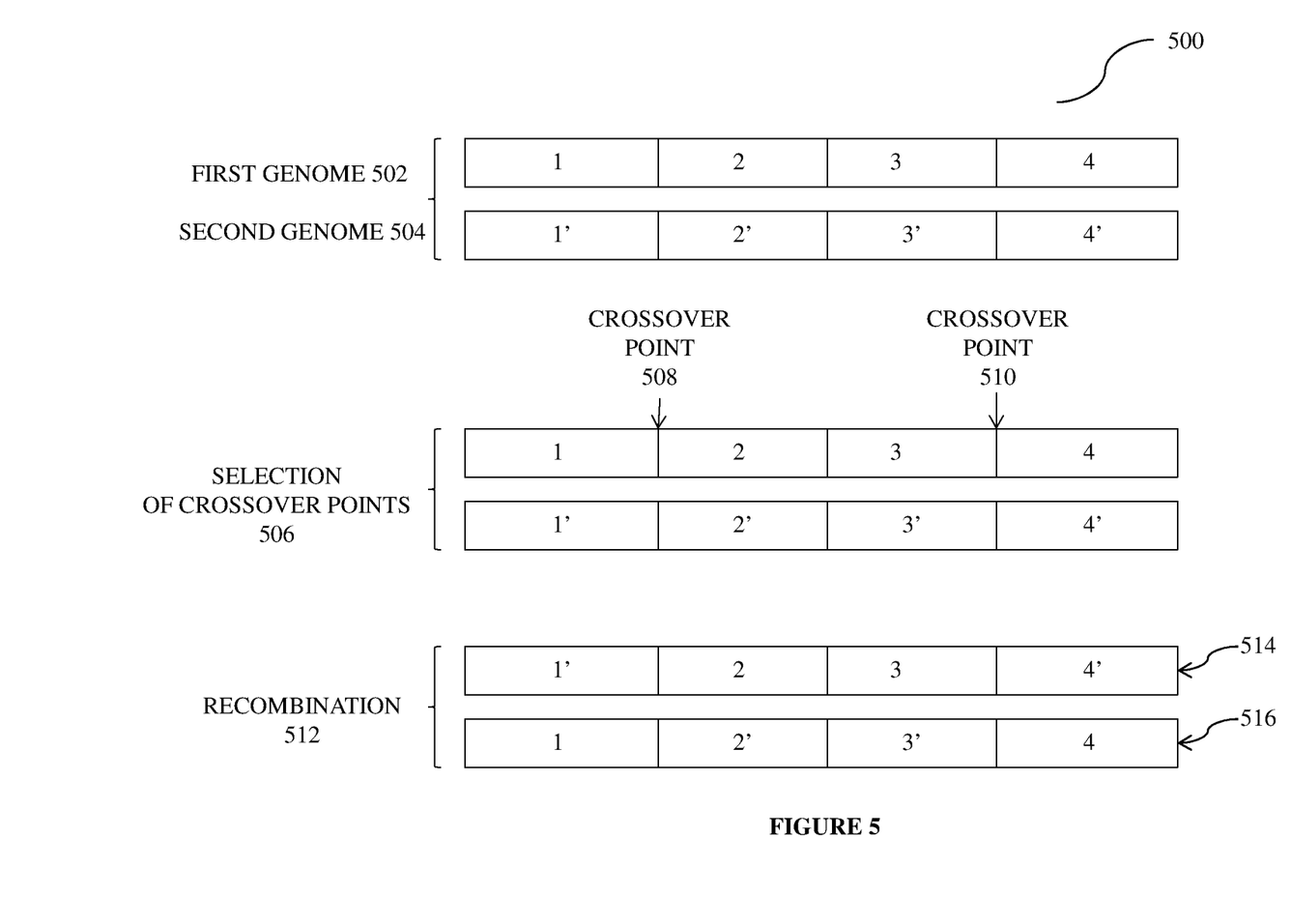
FIG. 5 illustrates the recombination of two genomes based on randomly selected crossover points.

FIG. 5 illustrates the recombination of first genome 502 and second genome 504 based on randomly selected crossover points.

First genome 502 and second genome 504 comprise any genome with identical ordering of jobs and distribution of tasks throughout the genome such that the two genomes are mirror images of each other except for the task heuristics assigned to each job or task. However, first genome 502 and second genome 504 can differ in the order that tasks associated with each job are carried out. For example, job/gene 1 in first genome 502 and job/gene 1' in second genome 504 can comprise the same tasks that are executed in different chronological orders.

Selection of crossover points 506 occurs when recombination engine 500 selects crossover point 508 and crossover point 510 at random. Crossover points indicate points between jobs where two genomes exchange segments of their job schedules, which are represented as an ordered collection of genes in a genome. In the depicted embodiment, recombination engine 500 selects a crossover point between job 1 and job 2 and selects a second crossover point between job 3 and job 4. Recombination 512 occurs when the job schedules, represented by first genome 502 and second genome 504, are recombined at crossover points. In the depicted embodiment, first genome 502 and second genome 504 are recombined at crossover point 508 and crossover point 510 to create first recombined genome 514 comprising jobs 1'/2/3/4' and second recombined genome 516 comprising jobs 1/2'/3'/4.

In alternative embodiments, selection of crossover points 506 is not at random. Instead, selection of crossover points 506 are predetermined by an algorithm or by one or more users. For example, a user can program recombination engine 500 to avoid selecting crossover points in particular gene sequences in order to preserve groups of related jobs that should evolve together, such as interrelated jobs requiring specific manufacturing processes and/or special conditions to complete.

In a preferred embodiment where genomes are recombined using a position based crossover method, crossover points 506 are preselected to associate particular jobs or sets of jobs to particular genes or gene groups. Conventional crossover point methods add undesirable variability that can cause genomes to be inefficient or impossible to execute. By preselecting the positions of crossover points 506, the number and composition of jobs associated with each genome is preserved, thereby adding predictability and efficiency to the overall task scheduling system.

Figure 6:
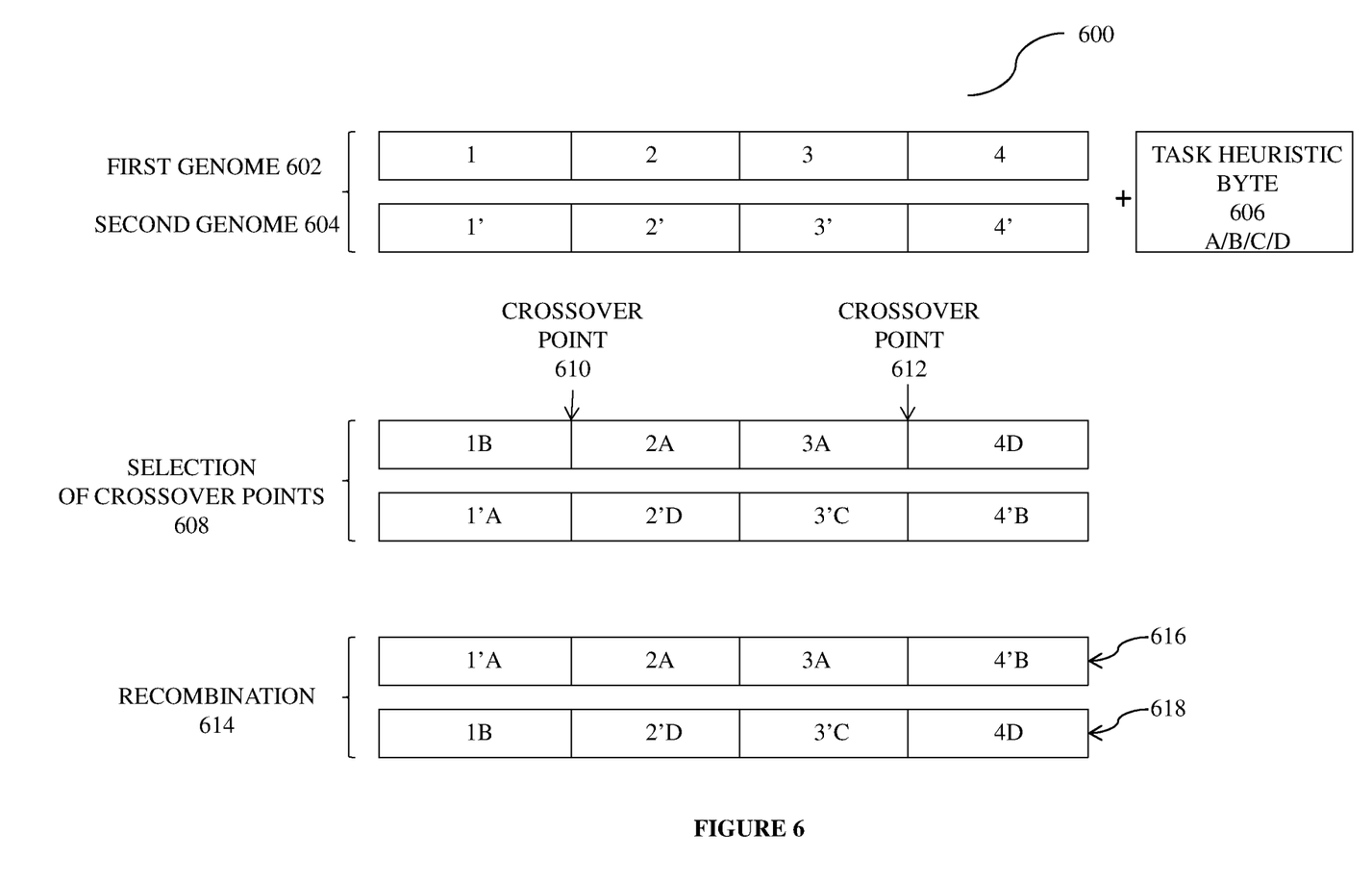
FIG. 6 illustrates the recombination of two genomes with a task heuristic byte based on randomly selected crossover points.

FIG. 6 illustrates the recombination of two genomes with a task heuristic byte based on randomly selected crossover points.

First genome 602 and second genome 604 comprise any genome with identical orderings of jobs and distribution of tasks throughout the genome such that the two genomes are mirror images of each other except for the task heuristics assigned to each job or task. However, first genome 602 and second genome 604 can differ in the order that tasks associated with each job are carried out. For example, job/gene 1 in first genome 602 and job/gene 1' in second genome 604 can comprise the same tasks that are executed in different orders.

Task heuristic byte 606 is coupled with every genome. Task heuristic byte 606 preferably assigns a task heuristic to each job in each genome at random. In some embodiments, task heuristic byte 606 assigns a task heuristic to each task of each job at random. Recombination engine 600 can alternatively be programmed to not assign particular task heuristics from task heuristic byte 606 to certain jobs and/or tasks. For example, recombination engine 600 can be programmed to avoid assigning task heuristics related to production speed where the production speed for a particular manufacturing step is invariable.

In the depicted embodiment, task heuristic byte 606 comprises four task heuristics represented by "A", "B", "C", and "D". Recombination engine 600 selects one of the four task heuristics at random as assigns them to each job of first genome 602 and second genome 604.

Selection of crossover points 608 occurs when recombination engine 600 selects crossover point 610 and crossover point 612 at random. Crossover points indicate points between jobs where two genomes exchange segments of their job schedules, which are represented as an ordered collection of genes in a genome. In the depicted embodiment, recombination engine 600 selects a crossover point between job 1 and job 2 and selects a second crossover point between job 3 and job 4. Recombination 614 occurs when the job schedules, represented by first genome 602 and second genome 604, are recombined at crossover points. In the depicted embodiment, first genome 602 and second genome 604 are recombined at crossover point 610 and crossover point 612 to create first recombined genome 616 comprising jobs and associated task heuristics 1'A/2A/3A/4'B and second recombined genome 618 comprising jobs 1B/2'D/3'C/4D.

In alternative embodiments, selection of crossover points 608 is not at random. Instead, selection of crossover points 608 is predetermined by an algorithm or by one or more users. For example, a user can program recombination engine 600 to avoid selecting crossover points in particular gene sequences in order to preserve groups of related jobs with unique attributes that should evolve together, such as interrelated jobs requiring specific manufacturing processes and/or special conditions to complete. In a position based crossover method, a user can program recombination engine 600 to avoid recombining predetermined sets of genes that have been shown to exceed an efficiency threshold. For example, if an order of manufacturing jobs in a genome achieves quick manufacturing times with exception quality control, then program recombination engine 600 can be programmed to prevent genetic changes to the order and task heuristics assigned to the manufacturing jobs in the genome.

Figure 7:
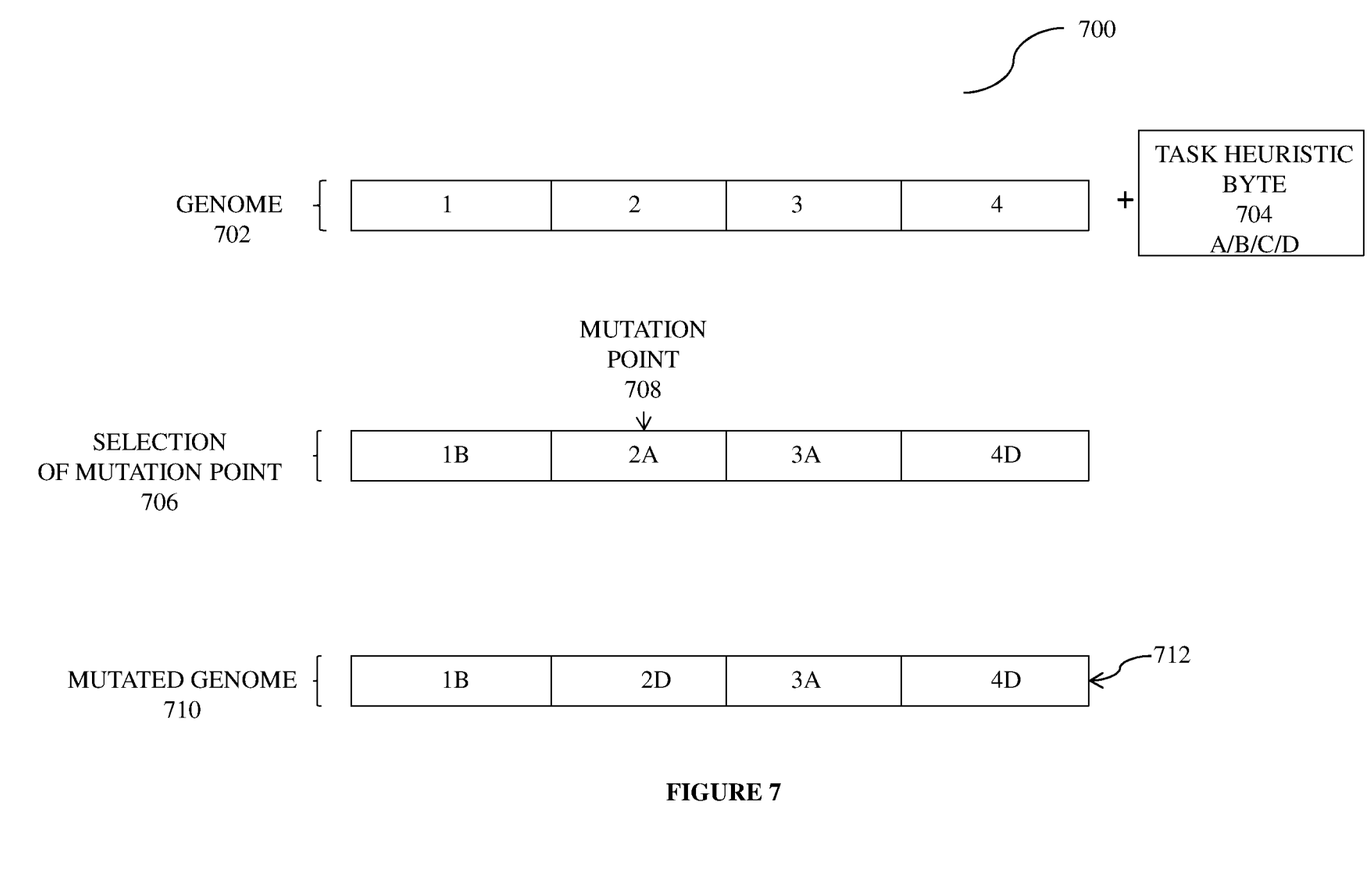
FIG. 7 illustrates the mutation of a genome based on randomly selected job.

FIG. 7 illustrates the mutation of a genome based on randomly selected job. Genome 702 is coupled with task heuristic byte 704, which preferably assigns a task heuristic to each job and/or task at random.

Selection of mutation point 708 occurs when mutation engine 700 selects mutation point 708 at random. Mutation points indicate one or more jobs to be randomly mutated by changing the order of tasks and/or the task priorities associated with each job and/or task. In the depicted embodiment, mutation engine 700 selects job 2 as mutation point 708. Mutation engine 700 randomly changes the task heuristic "A" associated with job 2 to "D".

The numerous advantages of the methods and systems described above can be further illustrated by way of working examples.

Task Scheduling Example

An administrator at a large hospital needs to schedule an open heart surgery, more specifically, an aortic valve replacement (i.e., the "task") for a patient that recently suffered a heart attack. The surgery requires one heart surgeon, one anesthesiologist, and at least three medical support staff, which include a surgical assistant, an equipment monitoring assistant, and a junior surgeon. The surgery also requires an operating room that can accommodate the size of the medical team during the four hour surgery, and that has the necessary equipment, tools, and consumables (e.g., human valve donor or a mechanical valve, blood transfusion machine, sufficient volume of blood for the transfusion, heart rate monitor, defibrillator, endoscopic video camera, surgical knives and other surgical tools, disinfectants, gauze, etc).

The administrator can use the genetic algorithm-based methods and systems herein in order to find the best way to perform the surgery subject to particular priorities. The administrator enters the overall objective which is associated with multiple jobs into task scheduling engine 100. The administrator designates task heuristics/task priorities that are relevant to the overall objective. For example, the task attributes, which are selected by the administrator, can include an urgency level, a specific date for the surgery, a "no-later-than" date for the surgery, the desired attributes of the necessary persons (e.g., type of surgeon, skill/experience level of the surgeon and staff, etc), and any other resources relevant to the task (e.g., heart donor, blood transfer, etc). Once the administrator has entered the task heuristics into task scheduling system 100, task scheduling engine 100 randomly assigns task heuristics to each job of the genome. Task scheduling engine 100 then determines a value score for the genome after each job in the genome is executed, which indicates a degree of completion and quality of execution in preferred embodiments.

Unlike the presently described scheduling system, conventional scheduling systems would merely compare availability of specific resources (i.e., specific people and specific resources), as for example availability of a specific surgeon or a particular heart valve. It would be up to the human administrator to determine the task requirements and what specific resources meet those requirements. In doing so, availability is treated as a preference or requirement.

In contrast, task scheduling engine 100 can access a preloaded database to automatically determine the attributes needed to accomplish the task (task preferences and requirements), and then automatically determines what specific resources are available to satisfy those task attributes. Availability of resource is merely one of many different resource attributes and can be treated as either a preference or requirement.

In one aspect, task scheduling engine 100 advantageously allows the administrator to rank task attributes by level of importance. For example, the administrator may wish to rank the date of the surgery as a higher importance than the availability of a particular piece of equipment. The flexibility provided by task scheduling engine 100 eases the administrator's burden of allocating resources in a complex organization such as a large hospital.

In another aspect, task scheduling engine 100 allows the administrator to create dependencies between different, yet related tasks. For example, the heart surgery patient may have multiple tasks that need to be performed before and after surgery (e.g., fasting before the surgery, allocating a clean-up crew for the surgery theatre, or a post-op recovery room for the patient). The existence of dependencies between different tasks can be inputted into task scheduling engine 100 as a task attribute of the present task to ensure that all related resources are available before scheduling the present task.

Task scheduling engine 100 also allows the administrator to rank tasks according to a level of urgency. As used herein, the concept of ranking tasks is conceptually different from ranking task attributes. For example, the administrator may wish to assign an elective surgery a low urgency and an emergency surgery a high urgency, to ensure that task scheduling engine 100 assigns a task heuristic based on the emergency surgery priority. Task scheduling engine 100 can even be used to cancel tasks, when a higher importance task needs to be scheduled. For example, an emergency surgery (i.e., a "high priority task") for an emergency room ("ER") patient may supersede a previously scheduled elective surgery (i.e., a "low priority task"), causing a cascade effect that may delay the elective surgery a few hours or even a few days.

In yet another aspect, task scheduling engine 100 can be used to take into account patient preferences. For example, the patient may wish to exclude students from observing the surgery and may wish to wait for a human valve rather than a mechanical valve. These preferences can be entered into task scheduling engine 100 to determine which task heuristics can be assigned to particular jobs in the genome.

Recombination Example

Once the task scheduling example has been completed multiple times and created various genomes each associated with value scores based on their task heuristics, recombination engine 300 can select two genomes with similar value scores. Preferably, recombination engine 300 can selects the two highest scoring genomes to recombine. Alternatively, recombination engine 300 can select the highest scoring genome for one metric and recombine it with a highest scoring genome for a different metric. For example, recombination engine 300 can select a first genome associated with the quickest manufacturing time for a widget and recombine it with a second genome with the highest level of quality control for the widget.

Over many cycles of recombination and subjecting genomes to fitness evaluations, the method achieving an overall objective is continuously refined to eventually yield the most effective solution based on the established task priorities. Recombination example #2 illustrates how the inventive methods and systems described herein go way beyond coordinating the availability of specific people or resources. Rather, recombination engine 300 automates the decision-making process to discover the most effective way of achieving an overall objective by using the principles of genetic recombination and evolution and related fitness functions.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of controlling one or more machines using heuristics for task selection in a genetic algorithm, comprising:
    generating a population of tasks associated with an overall objective;
    receiving a first selection of at least a first job and a second job associated with the overall objective, wherein the first job and the second job are operationally linked to each other, and wherein the first job and the second job form a first group of jobs;
    receiving a second selection of at least a third job and a fourth job associated with the overall objective, wherein the third job and the fourth job are operationally linked to each other, and wherein the third job and the fourth job form a second group of jobs;
    compiling at least the first group of jobs and the second group of jobs into a genome;
    assigning a first set of one or more tasks to at least the first job and the second job;
    assigning a second set of one or more tasks to at least the third job and the fourth job;
    assigning a task heuristic byte to the genome, wherein the task heuristic byte defines task heuristics that can be applied to at least one of the first job, the second job, the third job, and the fourth job,
        wherein the task heuristic defines a selection criterion associated with each job that is applied to the one or more tasks,
        wherein the selection criterion is a task-dependent variable; and assigning a first task heuristic from the task heuristics to the first job, a second task heuristic from the task heuristics to the second job, a third task heuristic from the task heuristics to the third job, and a fourth task heuristic from the task heuristics to the fourth job;

causing one or more of the machines to execute a first set of tasks associated with the first group of jobs according to the first task heuristic and the second task heuristics, and a second set of tasks associated with the group of jobs according to the third task heuristic and the fourth task heuristic;

determining a value score for the genome using a fitness function; and determining a crossover point in the genome,
wherein the crossover point prevents the first job and the second job from being separated, and
wherein the crossover point prevents the third job and the fourth job from being separated.

2. The method of claim 1, wherein the task heuristic is selected from the group consisting of: a most resource intensive task, a least resource intensive task, an earliest due date, a latest due date, a shortest completion time, a longest completion time, an alphabetically earliest name, an alphabetically latest name, a highest priority, and a lowest priority.

3. The method of claim 1, wherein assigning the task heuristic byte to the first task genome further comprises assigning a single gene per job specifying the task heuristic.

4. The method of claim 1, further comprising:
associating the one or more tasks with the each job;
converting the one or more tasks associated with the each job into one or more multi-node tree graphs, wherein the job is a root node and each task associated with the job branches off of the root node.

5. The method of claim 1, further comprising:
identifying a second genome associated with the multiple task heuristics;
randomly selecting one or more jobs associated with the overall objective;
switching the placement of the one or more jobs between the genome and the second genome to create a recombined genome; wherein the each job comprises the one or more tasks and is mirrored in both the genome and the second genome; and
determining a value score of the recombined genome.

6. The method of claim 1, further comprising:
randomly selecting a job;
determining the task heuristic and the tasks associated with the job;
randomly changing one or more variables associated with the job to create a mutated job; and
integrating the mutated job into the task genome in place of the job.

7. The method of claim 6, wherein the one or more variables are selected from the group consisting of: tasks, task heuristics, and an ordering of the tasks.

8. The method of claim 1, wherein at least one time-independent metric is based on at least one of process accuracy and financial considerations.

9. A method of controlling one or more physical manufacturing resources, comprising:
generating a population of resources;
receiving a first selection of at least a first resource and a second resource associated with one or more jobs that comprise one or more tasks associated with an overall objective, wherein the first resource and the second resource are operationally linked to each other, and wherein the first resource and the second resource form a first group of resources;
receiving a second selection of at least a third resource and a fourth resource associated with the overall objective, wherein the third resource and the fourth resource are operationally linked to each other, and wherein the third resource and the fourth resource form a second group of resources;
compiling at least the first group of resources and the second group of resources into a resource genome;
calculating resource utilization and overall resource time required to complete the one or more jobs based on the one or more tasks;
assigning a resource heuristic byte to the resource genome, wherein the resource heuristic byte defines resource heuristics that can be applied to the one or more jobs,
wherein the resource heuristic defines a selection criterion associated with each resource that is applied to the one or more tasks,
wherein the selection criterion is a resource-dependent variable; and
assigning a first set of resource heuristics from the resource heuristics to the first resource and the second resource;
assigning a second set of resource heuristics from the resource heuristics to the third resource and the fourth resource;
causing one or more manufacturing resources to execute one or more tasks associated with the first group of resources based on at least the first set of resource heuristics and the second group of resources based on at least the second set of resource heuristics; and
determining a value score using a fitness function; and
determining a crossover point in the genome, wherein the crossover point prevents the first group of resources and the second group of resources from being separated.

10. The method of claim 9, assigning the resource heuristic byte to the first resource genome further comprises assigning a single gene per resource specifying the resource heuristic.

11. The method of claim 9, further comprising:
identifying a second resource genome associated with the resource heuristics;
randomly selecting one or more resources associated with the each job of the overall objective;
switching the placement of the one or more resources between the resource genome and the second resource genome to create a recombined resource genome; wherein each resource is used in both the resource genome and the second resource genome; and
determining a value score of the recombined resource genome.

12. The method of claim 9, further comprising:
randomly selecting a resource;
determining the resource heuristic and the resource associated with the job;
randomly changing one or more variables associated with the resource to create a mutated resource; and
integrating the mutated resource into the resource genome in place of the resource.

13. The method of claim 9, wherein at least one time-independent metric is based on at least one of process accuracy and financial considerations.

* * * * *